US009721610B2

(12) United States Patent
Ashida et al.

(10) Patent No.: US 9,721,610 B2
(45) Date of Patent: *Aug. 1, 2017

(54) METHOD OF MANAGING, WRITING, AND READING FILE ON TAPE

(71) Applicant: International Business Machines Corporation, Armonk, NY (US)

(72) Inventors: Takashi Ashida, Yamato (JP); Tohru Hasegawa, Tokyo (JP); Hiroshi Itagaki, Yokohama (JP); Shinsuke Mitsuma, Tokyo (JP); Terue Watanabe, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 123 days.

This patent is subject to a terminal disclaimer.

(21) Appl. No.: 14/719,344

(22) Filed: May 22, 2015

(65) Prior Publication Data

US 2016/0012073 A1    Jan. 14, 2016

(30) Foreign Application Priority Data

Jul. 11, 2014   (JP) ................................. 2014-143728

(51) Int. Cl.
   *G11B 20/12*   (2006.01)
   *G11B 27/10*   (2006.01)
   *G11B 27/32*   (2006.01)
(52) U.S. Cl.
   CPC ........ *G11B 20/1201* (2013.01); *G11B 27/107* (2013.01); *G11B 27/328* (2013.01);
   (Continued)

(58) Field of Classification Search
   CPC ........ G11B 20/1201–20/1202; G11B 20/1205; G11B 2020/1264–2020/1267;
   (Continued)

(56) References Cited

U.S. PATENT DOCUMENTS 6,675,177 B1 *  1/2004  Webb ................. G06F 11/1458
6,941,328 B2 *  9/2005  Cannon .............. G06F 11/1451
(Continued)

FOREIGN PATENT DOCUMENTS

JP    2011197977 A    10/2011
JP    2013161185 A     8/2013
(Continued)

OTHER PUBLICATIONS

Decision of Refusal, Patent Application No. 2014-143728, Date of Drafting: Aug. 24, 2016, 6 pages.
(Continued)

*Primary Examiner* — Wayne Young
*Assistant Examiner* — James L Habermehl
(74) *Attorney, Agent, or Firm* — Scott S. Dobson (57) ABSTRACT

Managing a file on a tape. In response to a request to write a first file to a tape, whether a second file including data identical to the first file already exists on the tape is detected. If the second file exists, a first index of the second file is updated. After completing the write of the first file, metadata, including data starting position and size of the first file, is added to the first index. In response to a request to read the first or second files, the metadata of the first and second indexes are read. Based on the metadata, which of the first or second files can be accessed faster from a current head position is determined. The first file or the second file that can be accessed faster is then read from the tape.

3 Claims, 7 Drawing Sheets

(52) U.S. Cl.
CPC .................. *G11B 2020/1265* (2013.01); *G11B 2020/1295* (2013.01)

(58) Field of Classification Search
CPC ................................. G11B 2020/1291; G11B 2020/1294–2020/1297; G11B 27/10–27/102; G11B 27/107; G11B 27/327–27/328; G11B 27/19; G11B 27/28–27/30; G11B 27/32
USPC .......... 360/31, 48, 53, 55, 69, 71, 72.1–72.2
See application file for complete search history.

(56) References Cited

U.S. PATENT DOCUMENTS

| | | | | |
|---|---|---|---|---|
| 8,832,365 | B1 * | 9/2014 | Sims | G06F 3/0686 711/111 |
| 8,954,663 | B1 * | 2/2015 | Klein | G11B 27/28 711/111 |
| 9,058,843 | B2 * | 6/2015 | Iwanaga | G11B 20/1201 |
| 9,063,666 | B2 * | 6/2015 | Amir | G11B 20/1201 |
| 9,235,347 | B2 * | 1/2016 | Klein | G11B 27/28 |
| 9,323,776 | B2 * | 4/2016 | Sims | G06F 3/0686 |
| 9,348,837 | B2 * | 5/2016 | Iwanaga | G06F 17/30091 |
| 9,430,155 | B2 * | 8/2016 | Amir | G11B 27/032 |
| 2014/0379980 | A1 * | 12/2014 | Hasegawa | G06F 3/065 711/111 |
| 2015/0046645 | A1 * | 2/2015 | Iwanaga | G06F 3/0682 711/111 |
| 2015/0149415 | A1 * | 5/2015 | Iwanaga | G06F 11/1469 707/684 |
| 2015/0293935 | A1 * | 10/2015 | Abe | G06F 17/30073 707/611 |
| 2015/0347022 | A1 * | 12/2015 | Ashida | G06F 3/0607 711/113 |
| 2015/0363119 | A1 * | 12/2015 | Itagaki | G11B 27/10 711/111 |
| 2016/0098221 | A1 * | 4/2016 | Klein | G11B 27/28 711/111 |
| 2016/0203160 | A1 * | 7/2016 | Sims | G06F 3/0686 707/667 |

FOREIGN PATENT DOCUMENTS

| | | |
|---|---|---|
| JP | 2013182476 A | 9/2013 |
| JP | 2013206518 A | 10/2013 |
| WO | 2010073776 A1 | 7/2010 |

OTHER PUBLICATIONS

Decision to Grant a Patent, Patent Application No. 2014-143728, Date of Drafting: Oct. 31, 2016, 6 pages.
List of IBM Patents or Patent Applications Treated as Related, dated Jan. 12, 2017, pp. 1-2.
Ashida et al., "Method of Managing, Writing, and Reading File on Tape", U.S. Appl. No. 15/405,667, filed Jan. 13, 2017.
Application No. 2014-143728 (Japan), titled "Method of Managing, Writing, and Reading File on Tape," filed on Jul. 11, 2014, pp. 1-33.

* cited by examiner

```
<name>FileA</name>        ------ (1)
<length>13</length>
<readonly>false</readonly>
<creationtime>2012-10-10T01:20:27.000818000Z</creationtime>
<changetime>2012-12-10T00:25:33.000367000Z</changetime>
<modifytime>2012-12-10T00:25:33.000367000Z</modifytime>
<accesstime>2012-12-10T00:25:33.000364000Z</accesstime>
<backuptime>2012-10-10T01:20:27.000818000Z</backuptime>
<fileuid>1014</fileuid>
<extentinfo>
```

E1:
```
    <extent>
        <fileoffset>0</fileoffset>
        <partition>b</partition>
(2) --  <startblock>1036</startblock>   } -- (4)
        <byteoffset>0</byteoffset>
        <bytecount>5</bytecount>
```

E3:
```
        <dupextent>
(8) --  <startblock>xxxx</startblock>
        <byteoffset>0</byteoffset>      } --- (6)
        <bytecount>5</bytecount>
        <dupextent>
```

E4:
```
        <dupextent>
(9) --  <startblock>yyyy</startblock>
        <byteoffset>0</byteoffset>      } --- (7)
        <bytecount>5</bytecount>
        <dupextent>
    </extent>
```

E2:
```
    <extent>
        <fileoffset>5</fileoffset>
        <partition>b</partition>
(3) --  <startblock>1040</startblock>   } --- (5)
        <byteoffset>0</byteoffset>
        <bytecount>8</bytecount>
    </extent>
</extentinfo>
```

METHOD OF MANAGING, WRITING, AND READING FILE ON TAPE

BACKGROUND

The present invention relates file systems, and more particularly to the management, writing, and reading of a file on a file system.

LTFS (Linear Tape File System) is a mechanism for accessing data in a tape drive as a file in a file system. In the LTFS, metadata (such as the position and size of a data area) indicating the position on a tape of the data area constituting the file, and the like, is stored as an index in the file system. The use of LTFS enables use of the tape as a storage destination of the file in a manner similar to that of a storage device such as an HDD or a USB memory.

In the LTFS, upon editing (updating) a file, data of files previously written to the tape are not overwritten. Rather, edited data is appended after the previously written data. Upon reading data, the data is read after a magnetic head and the tape are aligned in a position where the data is written (movement of the tape and/or the magnetic head). The positioning may take time, and if an application created on the assumption of use of an HDD or a USB memory is applied to the tape, the speed of file reading operations may be very slow.

Figure 1:
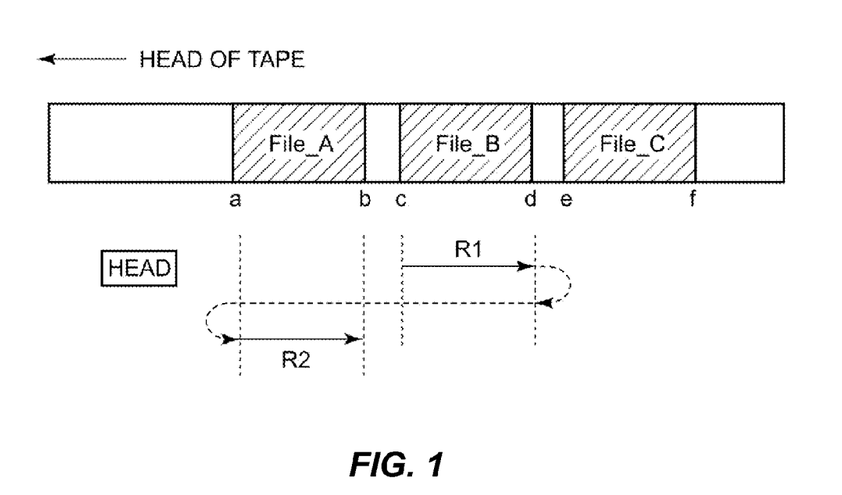
FIG. 1 is a diagram showing a structure example of data on a tape.

For example, as shown in FIG. 1, it is assumed that file A, file B, and file C are written on the tape in this order. In this case, when the file A is read after the file B is read, the head needs to be moved (by rewinding the tape) to position a after the head reads data from position c to position d on the tape (R1) to read data of the file A up to position b (R2). It may take several seconds to several tens of seconds for this movement of the head (to rewind the tape). In such a case, if an application created on the assumption of use of an HDD or a USB memory is used, a problem may occur due to relatively slow read operation.

BRIEF SUMMARY

Embodiments for managing a file on a tape in a file system are disclosed. According to one aspect of the present invention, in response to a request to write a first file to a tape, it is detected whether a second file including data identical to data of the first file already exists on the tape. If the second file exists on the tape, a first index of the second file is updated. In response to completing the write of the first file to the tape, metadata, including a data starting position and a size of the first file, is added to the first index. In response to a request to read the first file or the second file, the metadata of the first index and the second index are read. Based on the read metadata, which of the first file and the second file can be accessed faster from a current head position is determined. The first file or the second file that can be accessed faster is then read from the tape.

According to another aspect of the present invention, in response to a request to write a first file to a tape, whether a second file including data identical to data of the first file already exists on the tape is detected. The first file is written onto the tape. If the second file exists on the tape, metadata of a first index of the second file is updated to include a data starting position and a size of the first file on the tape.

According to another aspect of the present invention, in response to a request to read a first file from a tape, it is detected whether other data identical to data of the first file exists on the tape. If other identical data exists on the tape, which of the data of the first file and the other identical data can be accessed faster from a current head position is determined. The data of the first file or the other identical data that can be accessed faster is then read from the tape.

BRIEF DESCRIPTION OF THE DRAWINGS

FIG. 7 is a diagram showing a structure example of metadata of the present invention.

DETAILED DESCRIPTION

Embodiments of the present invention will be described with reference to the accompanying drawings. Note that the following will describe the embodiments of the present invention while comparing it with a conventional technique as needed.

Figure 2:
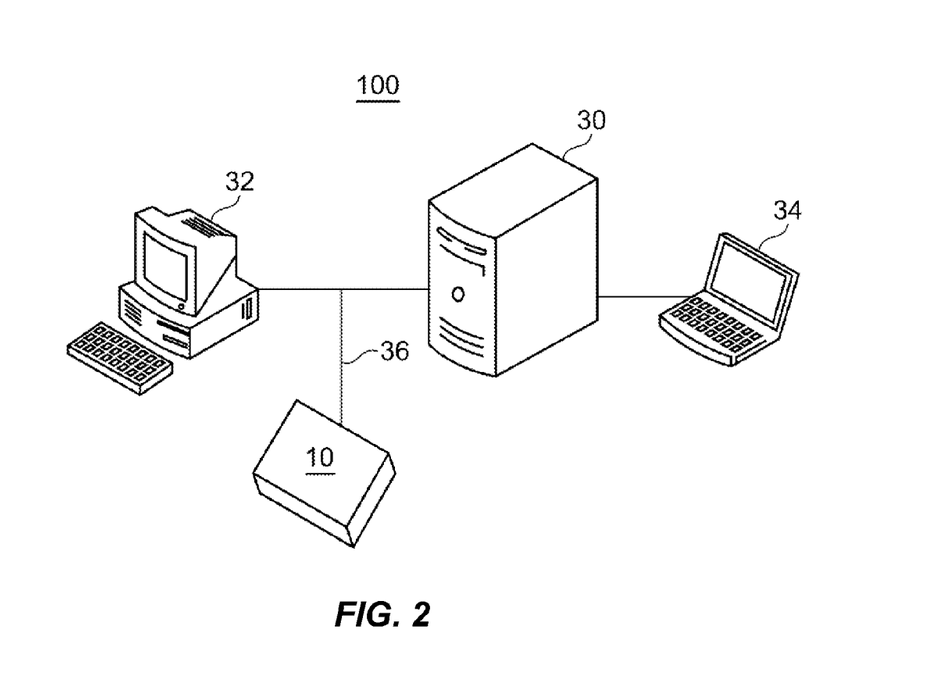
FIG. 2 is a diagram showing a configuration example of a file system of the present invention.

FIG. 2 is a diagram showing a configuration example of a file system in which a method of the present invention may be implemented. A file system 100 includes a tape drive 10, a host (server) 30, and PCs (terminals) 32, 34, which are communicable with one another over a network 36. The tape drive 10 and the host (server) 30 are each illustrated as one component in FIG. 2, but this is just an example. In other embodiments, two or more tape drives 10 and hosts (servers) 30 may be included.

In an embodiment, the file system 100 may be an LTFS. As with an HDD, a USB memory, or other removable recording media such as a CD-R, the LTFS provides a mechanism that enables direct access to a file stored in a tape cartridge when the tape cartridge is mounted in the tape drive.

Figure 3:
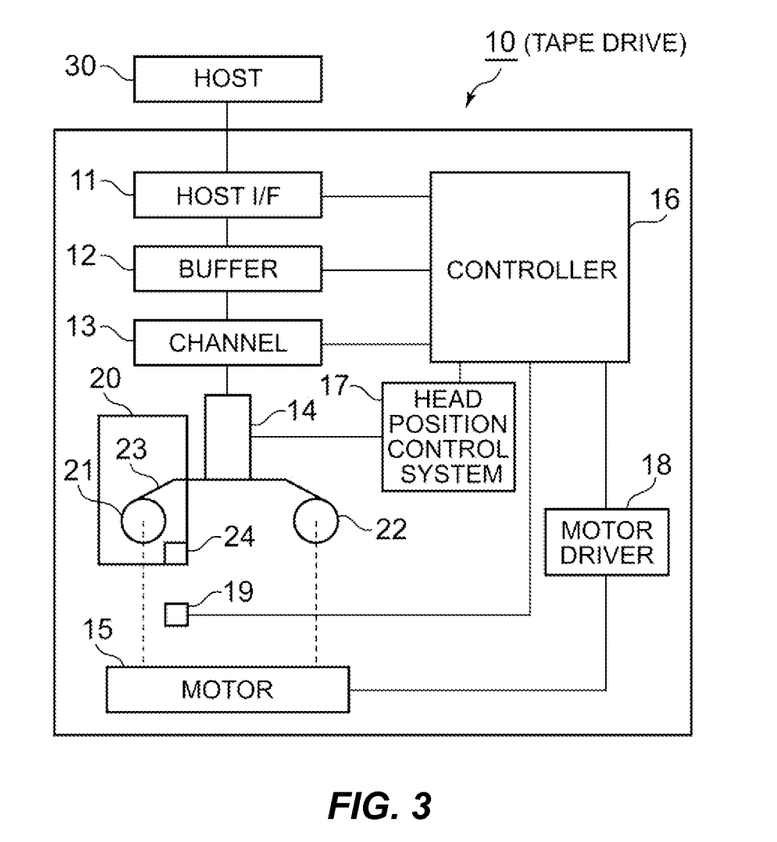
FIG. 3 is a block diagram showing a configuration example of a tape drive of the present invention.

FIG. 3 is a diagram showing an example configuration of the tape drive 10 in the file system 100 in FIG. 2. The tape drive 10 includes a host interface (hereinafter called "host I/F") 11, a buffer 12, a channel 13, a head 14, and a motor 15. The tape drive 10 also includes a controller 16, a head position control system 17, and a motor driver 18. Since a tape cartridge 20 is loadable when the tape cartridge 20 is inserted into the tape drive 10, the tape cartridge 20 is shown here. The tape cartridge 20 includes a tape 23 wound on reels 21 and 22. The tape 23 moves in a longitudinal direction with the rotation of the reels 21 and 22, from the reel 21 to the reel 22 or from the reel 22 to the reel 21.

The tape cartridge 20 also includes a cartridge memory (CM) 24. The CM 24 may record, for example, in a noncontact mode using an RF interface, information, for example, about how data was written on the tape 23. For example, an index written to CM 24 of data written on the tape 23 may be accessed in a noncontact mode to enable high-speed access to the data. In FIG. 3, an example RF interface for performing access to the CM 24 is shown as a cartridge memory interface (hereinafter referred to as "CM I/F") 19.

In an embodiment, the host I/F 11 communicates with the host (server) 30 or the other PC 32. For example, the host I/F 11 receives, from an OS of the host 30, a command, or request, to write data to the tape 23, a command to move the tape 23 to a target position, and a command to instruct reading of data from the tape 23. In the example of the LTFS described above, data on a tape mounted in the tape drive can be referenced directly from a desktop OS or the like, and the file can be executed by the double click or copied by the drag-and-drop action, similar to how a file is accessed on an HD.

The buffer 12 is a memory for accumulating data from host 30 to be written to the tape 23, or for accumulating data read from the tape 23 to be transmitted to host 30. For example, the buffer 12 is made up of a DRAM. Further, the buffer 12 is composed of multiple buffer segments, where each buffer segment stores a dataset as a unit of reading from or writing to the tape 23.

The channel 13 is a communication channel used to send the head 14 data to be written to the tape 23 or to receive, from the head 14, data read from the tape 23. The head 14 writes information to the tape 23 or reads information from the tape 23 when the tape 23 moves in the longitudinal direction. The motor 15 rotates the reels 21 and 22. Although the motor 15 is represented by one rectangle in FIG. 3, it is preferable to provide one motor for each of the reels 21 and 22, i.e., two motors in total.

The controller 16 controls the tape drive 10. For example, the controller 16 controls writing of data to the tape 23 and reading of data from the tape 23 according to the commands accepted at the host I/F 11. The controller 16 also controls the head position control system 17 and the motor driver 18. The head position control system 17 is a system for keeping track of a desired wrap. Here, wrap means a group of multiple tracks on the tape 23. When it is necessary to switch from one wrap to another, the head 14 also needs to be electrically switched. Such switching is controlled by the head position control system 17.

The motor driver 18 drives the motor 15. As mentioned above, if two motors 15 are used, two motor drivers 18 will be provided. The CM I/F 19 is, for example, implemented by an RF reader/writer to write information to the CM 24 and read information from the CM 24.

In the LTFS, logical blocks on a tape, which are called partitions and the support of which is started from LTO-5, are used. There are two types of partitions—an index partition and a data partition. The data partition is composed of data constituting a file, and an index to be written when certain conditions are met after completion of writing the file. In the index partition, the latest index is stored and is read when a cartridge is loaded so that the position of a file on the tape can be determined. Metadata to be described later is included in the index.

Figure 4:
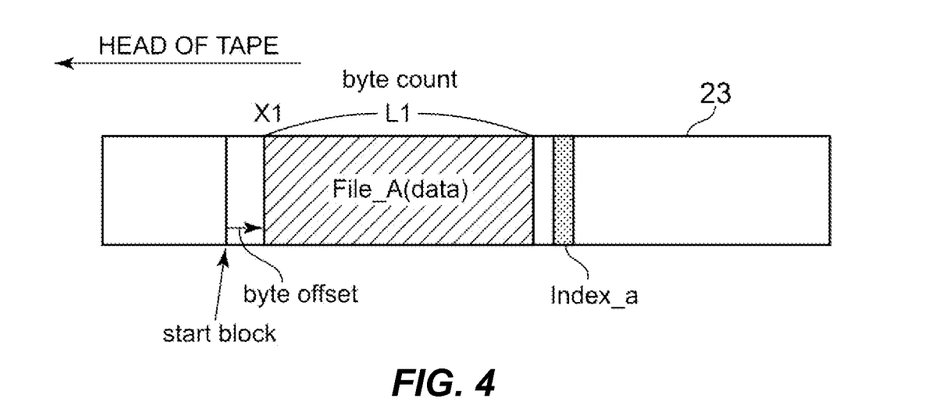
FIG. 4 is a diagram showing a structure example of a data partition.

FIG. 4 shows a structure example of a data partition. In FIG. 4, a file A is made up of data and an associated index (index_a). In the index (index_a), a partition ID, a start block, a byte offset, a byte count, and a file offset are included as elements constituting metadata to specify the position of a file on the tape 23, and these elements are collectively called an extent. The content of each element is as follows. In the following description, data included in one file may be called simply data or a data area. Further, information (elements) included in an index is called metadata or an extent.

(a) File offset: An indication of where data constituting this extent is located in the entire file.

(b) Partition ID: A logical ID assigned to the partition.

(c) Start block: An indication of the number of a block in which a leading part of data constituting the file is included, where the concept of block is used to indicate the position of data on the tape, and the block is set to 512 KB by default.

(d) Byte offset: An offset indicating where the head position of data starts on the block.

(e) Byte count: An indication of the number of bytes that constitute the data.

In an index of the LTFS, when a file is written onto a tape, the entire file is written as one extent. This enables the next reading of the file efficiently with one access. This extent will be further described later with reference to FIG. 7.

Figure 5:
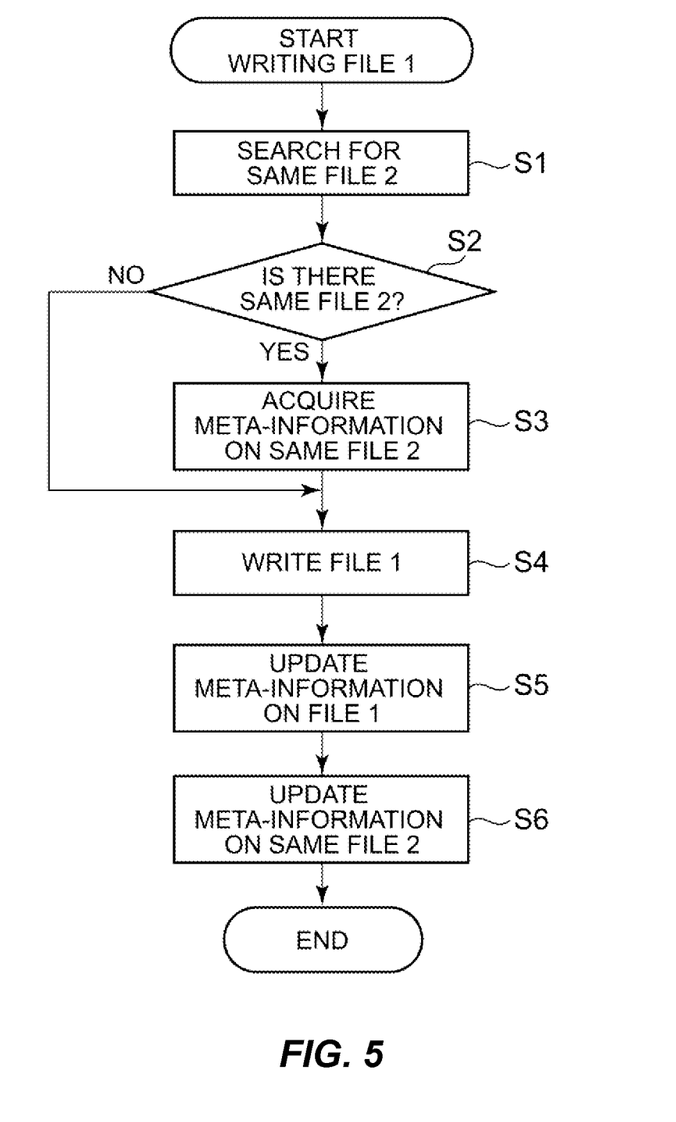
FIG. 5 is a flowchart showing a method of one embodiment of the present invention.

Referring to FIG. 5 to FIG. 9, embodiments of a method of the present invention will be described. The embodiments of the method of the present invention are implemented by using software and hardware available on any of the computers 30 to 34 or the tape drive 10 in the file system 100. FIG. 5 is a flowchart showing a method (operation) of the present invention upon writing a file. FIG. 5 shows an example of a case where a file 1 is written. In the case where two or more files are written continuously or discretely, the basic operation flow is the same. Note that each of the following examples (embodiments) will describe a case where the LTFS is used as the file system 100, however other file system having similar functions/specifications may also be used.

In step S1, upon writing file 1 onto a tape, a Dedup Engine determines whether another file 2 including data identical to the data of the file 1 already exists on the tape. In this example, the Dedup Engine may include conventional software technology used for Data Deduplication. In an embodiment, the Dedup Engine may be integrated into the LTFS as software, or external software or hardware called by the LTFS. If the Dedup Engine determines that a file 2 that includes data identical to the data of the file 1 already exists on the tape, the Dedup Engine returns, for example, the Offset and Length of the matching parts of data of the files 1 and 2.

In step S2, it is determined, based on the search result of step S1, whether the other file 2 including data identical to the data of the file 1 already exists on the tape. When the determination is Yes, metadata on file 2 is identified in step S3. For example, the function of the Dedup Engine mentioned above is used in acquiring this metadata. The metadata includes at least the start position and the size of data to specify an area of the identical data of the file 2 on the tape. More specifically, the metadata can include at least some or all of (a) file offset, (b) partition ID, (c) start block, (d) byte offset, and (e) byte count mentioned above. When the determination in step S2 is No, the procedure proceeds directly to step S4.

In step S4, the file 1 is written onto the tape. In step S5, the metadata on the written file 1 is updated/created. In the metadata of file 1, the metadata of file 2 acquired in step S3 is also included in the metadata on the file 1. This enables the metadata on the two files 1 and 2 including the identical data to be acquired (read) from the metadata on the file 1. As illustrated in FIG. 4, the updated or created metadata is written to the data partition on the tape as an index (extent) at predetermined timing (after the lapse of a certain time, or the like), and further written to the index partition at predetermined timing (when the cartridge is removed, or the like).

In step S6, the metadata on the file 2 already written on the tape is updated. The update is done in such a manner that the metadata on the file 1 newly written is added to the metadata on the file 2 originally present. This enables the metadata on the two files 1 and 2 including the identical data to be acquired (read) from the metadata on the other file 2. As in the case of the file 1, the updated metadata is written to the data partition on the tape as an index (extent) at predetermined timing (after the lapse of a certain time, or the like), and further written to the index partition at predetermined timing (when the cartridge is removed, or the like).

Figure 6:
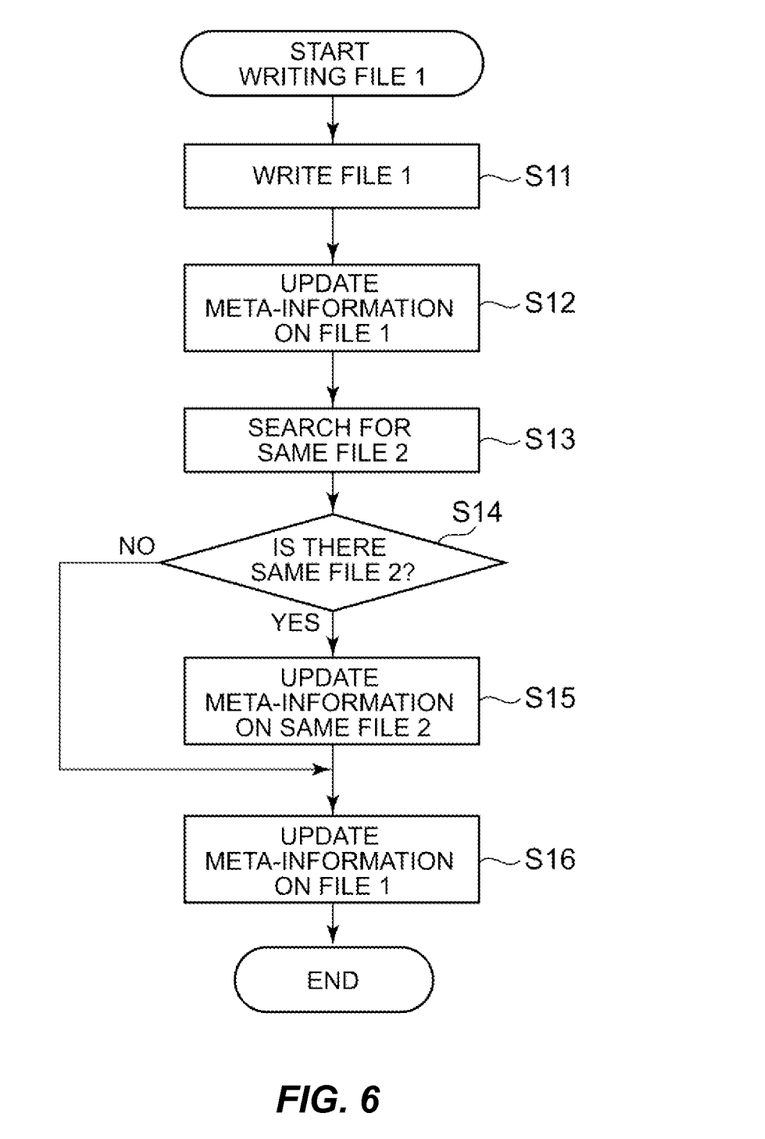
FIG. 6 is a flowchart showing a method of another embodiment of the present invention.

FIG. 6 is a flowchart showing another example of a method (operation) of the present invention for writing a file. In comparison with the method in FIG. 5, the method in FIG. 6 is such that the file 1 is written onto the tape in advance in step S11, and then only the metadata on the file 1 is updated/created in advance in step S12. The reason why the file 1 is written in advance is as follows. Although it is assumed that, when write data is generated, the Dedup Engine used in step S1 of FIG. 5 returns information on the data in a short time, the Dedup Engine may take time to return information on matching data. In order to handle this case, the information on matching data is specified later asynchronously with the writing (for example, when accesses to the LTFS are less frequent) to update the metadata.

As in the case of step S1 in FIG. 5, in step S13 of FIG. 6 a Dedup Engine determines whether another file 2 including data identical to the data of the file 1 already exists on the tape. Next, as in the case of step S2 in FIG. 5, based on the search result of step S13, it is determined in step S14 whether the file 2 including data identical to the data of the file 1 already exists on the tape. When the determination is No, the writing of the file 1 is ended. When the determination in step S14 is Yes, the metadata on the file 2 found is updated in step S15. For the update, original metadata on the file 2 is first acquired.

For acquiring the metadata, for example, the function of the above-mentioned Dedup Engine is used. Then, the metadata on the file 2 is updated to add, to the acquired metadata on the file 2, the metadata on the file 1 updated in step S12. In step S16, the metadata on the file 1 is further updated to add, to the metadata on the file 1 updated in step S12, the metadata on the file 2 originally present and acquired in step S15. In step S15 and step 16, based on the respective metadata updated, metadata on the two files 1 and 2 including the identical data can be acquired (read) from each metadata on the file 1 or the other file 2. In any of these cases, the updated metadata is written to the data partition on the tape as an index (extent) at predetermined timing (after the lapse of a certain time, or the like), and further written to the index partition at predetermined timing (when the cartridge is removed, or the like).

FIG. 7 shows an example of metadata (extent) after being updated in steps S5 and S6 of FIG. 5, or steps S15 and S16 of FIG. 6. In the LTFS, it is defined in the Format Specification that, when metadata is recorded on a tape, it is recorded in an XML format. The example of FIG. 7 is an example of the XML representation and relating to file metadata.

Information on extents is stored with corresponding tags <extent> tags. When one file is composed of multiple extents, the file has two or more <extent>tags. In the example of FIG. 7, a file named File A indicated at (1) is composed of two <extent>tags in a range indicated by E1 and E2. In the <extent>tag of E1, there are extents from the 1036-th block (2), and in the <extent>tag of E2, there are extents from the 1040-th block (3). In the content of each <extent>tag, tags corresponding to (a) file offset, (b) partition ID, (c) start block, (d) byte offset, and (e) byte count mentioned above are included ((4) and (5)).

In the example of FIG. 7, tags called <dupextent> indicated by E3 and E4 are created as child elements of the <extent>tag in the <extent>tag of E1. Tags <startblock>, <byteoffset>, and <bytecount> are included as the content of <dupextent> ((6) and (7)), and may be used to indicate that the identical data are written in different locations. In the example of FIG. 7, it is indicated that data identical to the data (2) starting from the 1036-th block exists in two locations on the tape as data ((8) and (9)) starting from xxxx block and yyyy block. Note that the tag names and the XML tag structure (elements) are just one example, and the description may be made with other names or any other structure.

Figure 8:
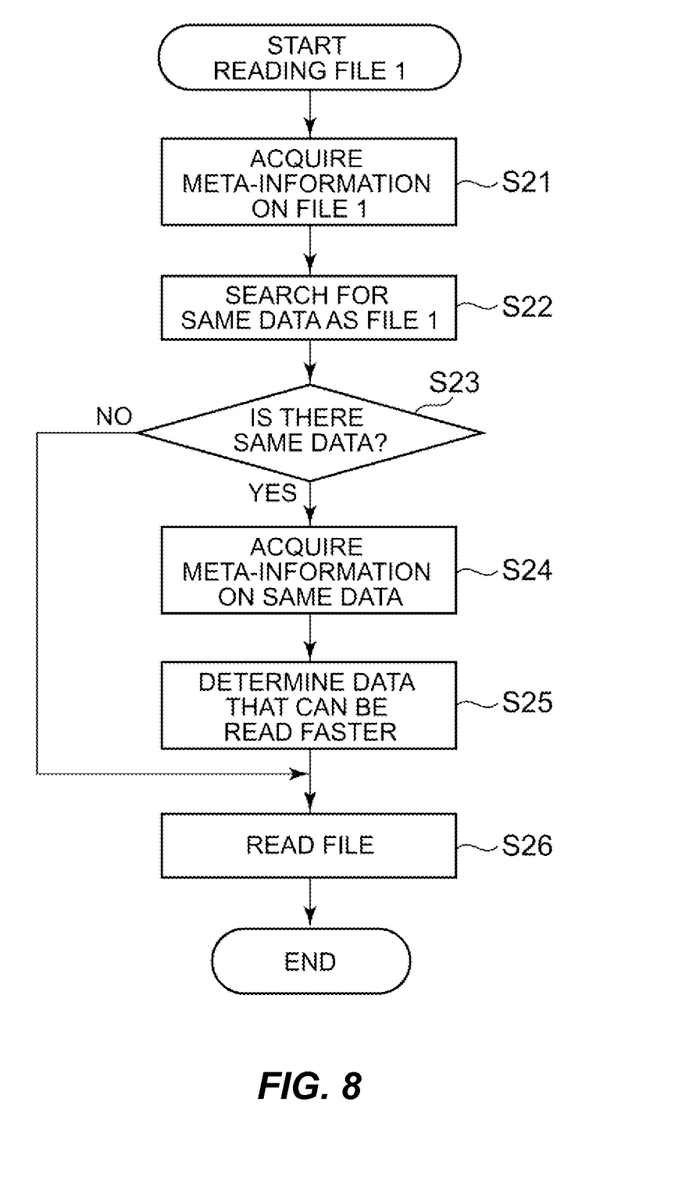
FIG. 8 is a flowchart showing a method of another embodiment of the present invention.

FIG. 8 shows a flowchart of one embodiment of a file reading method of the present invention. It is assumed in FIG. 8 that one file 1 is read. In a case where two or more files are read continuously or discretely, the basic operation method is the same. In step S21, metadata on file 1 is acquired. Specifically, metadata (extent) in an index written in the index partition and/or data partition on the tape is read to acquire position information on data of the file 1.

In step S22, it is searched whether metadata (extent) including data identical to the data of the file 1 exists on the tape. In this search, a determination can be made by determining whether <dupextent> as shown in E3 or E4 of FIG. 7 exists in the metadata on the file 1. Based on the search result of step S22, it is determined in step S23 whether data identical to data of the file 1 exists on the tape. When the determination is Yes, metadata on another file 2 found is acquired in step S24. When the determination in step S23 is No, the procedure proceeds to step S26.

In step S25, it is determined which of the identical data found and the data of the file 1 can be read faster from the current position of the head. The determination can be made, for example, by using a conventional technique, such as a method of determining the order of reading data as disclosed in PCT International Publication No. WO2010/073776. This method of determining the order of reading data is implemented in a tape drive so that the determination result can be acquired from the tape drive. In step S26, data that can be read faster and obtained in step S25 is read. When two or more identical data exist, data the reading of which is the fastest in all the data including that of the file 1 is selected and read.

Figure 9A:
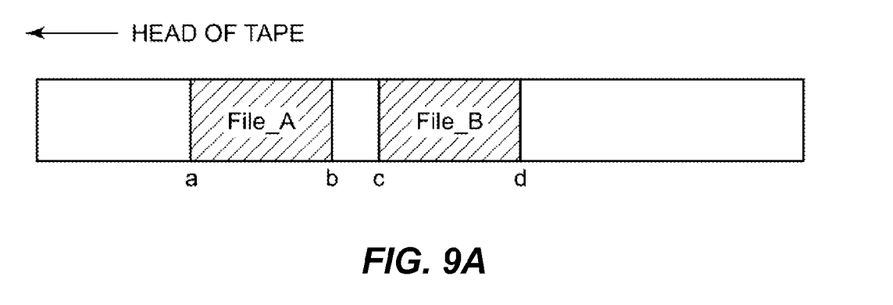
FIGS. 9A and 9B are diagrams showing a structure example of a data partition to which the method of the present invention is applied.
Figure 9B:
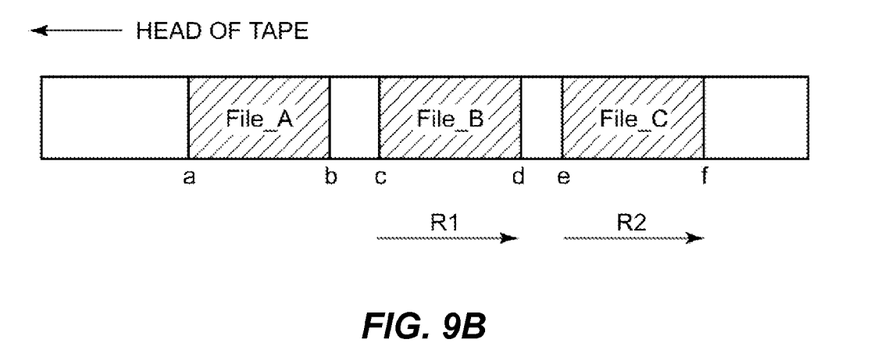

FIG. 9 illustrates a data structure in accordance with a method of the present invention. Note that indexes (extents) to be written in connection with data are omitted in FIG. 9. First, as shown in FIG. 9A, it is assumed that file A and file B are written on a tape. In this case, when file C is written as a new file, if the file C has the same data content as that of the file A, data of the file C is written on the tape as shown. Further, as metadata on the file A, not only position a but also position e on the tape are recorded as data starting positions in the manner, the details of which are as mentioned above. In addition, as metadata on the file C, both a and e are recorded as position information on the tape.

In this state, the data arrangement on the tape is as shown in FIG. 9B. At this time, when the file A is read after data from the position c to the position d on the tape is read to allow an application to read the file B (R1), data can be read from the position e without rewinding the tape to the position a (without moving the head) (R2). As a result, data of the file A can be read at a high speed.

The embodiments of the present invention have been described with reference to the accompanying drawings. However, the present invention is not limited to these embodiments. Further, the present invention can be carried out in other modes to which various improvements, modifications, and variations are added based on the knowledge of those skilled in the art without departing from the scope of the present invention.

What is claimed is:

1. A management method for a file on a tape in a file system, comprising:

when a file is to be written onto the tape, detecting, using software which has a detection function for duplicate data, whether another file including data identical to data of the file already exists on the tape;

when the other file exists on the tape, updating a first index of the other file;

after the file is written, adding meta-information including a data starting position and a size of the written file on the tape to the first index and writing in an index partition;

creating or updating a second index including meta-information including a data starting position and a size of the written file on the tape; and writing the created or updated second index in an index partition on the tape.

2. The method according to claim 1, further comprising:

writing the file onto the tape before the detecting.

3. The method according to claim 1, further comprising:

when the file or the other file on the tape is to be read, acquiring the meta-information of the first index and the second index from an index partition on the tape;

determining which of the file and the other file can be read faster based on the starting positions of the file and the other file from the acquired meta-information and a current head position; and reading, from the tape, the file or the other file that can be read faster.

* * * * *